United States Patent
Duda et al.

(10) Patent No.: US 9,509,603 B2
(45) Date of Patent: Nov. 29, 2016

(54) SYSTEM AND METHOD FOR ROUTE HEALTH INJECTION USING VIRTUAL TUNNEL ENDPOINTS

(71) Applicants: Kenneth James Duda, Santa Clara, CA (US); Douglas Alan Gourlay, San Francisco, CA (US)

(72) Inventors: Kenneth James Duda, Santa Clara, CA (US); Douglas Alan Gourlay, San Francisco, CA (US)

(73) Assignee: Arista Networks, Inc., Santa Clara, CA (US)

( * ) Notice: Subject to any disclaimer, the term of this patent is extended or adjusted under 35 U.S.C. 154(b) by 157 days.

(21) Appl. No.: 14/230,392

(22) Filed: Mar. 31, 2014

(65) Prior Publication Data

US 2015/0281062 A1 Oct. 1, 2015

(51) Int. Cl.
| | |
|---|---|
| G06F 15/173 | (2006.01) |
| H04L 12/741 | (2013.01) |
| H04L 12/46 | (2006.01) |
| H04L 12/745 | (2013.01) |
| H04L 12/56 | (2006.01) |
| H04L 12/721 | (2013.01) |

(52) U.S. Cl.
CPC ........... *H04L 45/74* (2013.01); *H04L 12/4641* (2013.01); *H04L 45/741* (2013.01); *H04L 45/748* (2013.01); *H04L 45/66* (2013.01)

(58) Field of Classification Search
CPC .... H04L 45/74; H04L 45/741; H04L 45/748
USPC ........................................................ 709/238
See application file for complete search history.

(56) References Cited

U.S. PATENT DOCUMENTS

| | | | | |
|---|---|---|---|---|
| 2006/0280146 A1* | 12/2006 | Koodli | .............. | H04W 36/0011 370/331 |
| 2009/0132701 A1* | 5/2009 | Snively | ............... | H04L 12/4625 709/224 |
| 2013/0266019 A1* | 10/2013 | Qu | .......... | H04L 49/70 370/395.53 |
| 2013/0322453 A1* | 12/2013 | Allan | ................... | H04L 12/4662 370/395.53 |
| 2014/0153577 A1* | 6/2014 | Janakiraman | ........... | H04L 47/28 370/392 |
| 2014/0348166 A1* | 11/2014 | Yang | ..................... | H04L 45/124 370/392 |
| 2014/0369345 A1* | 12/2014 | Yang | ...................... | H04L 12/18 370/355 |
| 2015/0009992 A1* | 1/2015 | Zhang | ................... | H04L 49/354 370/392 |
| 2015/0016300 A1* | 1/2015 | Devireddy | .......... | H04L 41/0893 370/254 |
| 2015/0055651 A1* | 2/2015 | Shen | ................... | H04L 12/1854 370/390 |
| 2015/0063353 A1* | 3/2015 | Kapadia | ................ | H04L 45/745 370/392 |
| 2015/0124805 A1* | 5/2015 | Yadav | ..................... | H04L 47/50 370/389 |
| 2015/0229724 A1* | 8/2015 | Ray | .......................... | H04L 67/14 370/352 |
| 2015/0281048 A1* | 10/2015 | Agarwal | ................. | H04L 45/44 370/236 |
| 2015/0281067 A1* | 10/2015 | Wu | .......................... | H04L 45/74 370/392 |

OTHER PUBLICATIONS

Mahalingam, M. et al., "VXLAN: A Framework for Overlaying Virtualized Layer 2 Networks over Layer 3 Networks", Internet Engineering Task Force, http://tools.ietf.org/id/draft-mahalingam-dutt-dcops-vxlan-07, Jan. 23, 2014. (24 pages).

* cited by examiner

*Primary Examiner* — Richard G Keehn
(74) *Attorney, Agent, or Firm* — Osha Liang LLP

(57) ABSTRACT

A system and method for route health injection using virtual tunnel endpoints. The method includes detecting, by a virtual tunnel endpoint (VTEP), that a new host is connected to the VTEP, where the VTEP is executing on the network device. The method further includes, based on the detecting, generating by the VTEP, a new route for the new host, where the new route is at least a longer match for the new host than currently existing routes for the new host, and providing the new route to a default gateway for the new host.

18 Claims, 6 Drawing Sheets

US 9,509,603 B2

SYSTEM AND METHOD FOR ROUTE HEALTH INJECTION USING VIRTUAL TUNNEL ENDPOINTS

BACKGROUND

It is becoming common for companies to locate their physical computing resources (e.g., servers) in one or more data centers. These data centers are typically located in different geographical locations. Use of the physical computing resources is typically managed by allowing end-users to execute applications on virtual machines, which execute on the physical computing resources. One of the benefits of using a virtual machine is that it can be migrated from one server to another in a manner that is transparent to the end-user. The migration of virtual machine may involve moving the virtual machine to another server in the same data center or moving the virtual machine to a server in another data center. Using traditional networking routing techniques, the migration of virtual machines between data centers may result in inefficient routing of packets to the virtual machine after it has been migrated.

SUMMARY

In general, in one aspect, the invention relates to a non-transitory computer readable medium comprising instructions, which when executed by a processor perform a method, the method comprising detecting, by a virtual tunnel endpoint (VTEP), that a new host is connected to the VTEP, wherein the VTEP is executing on the network device, based on the detecting, generating by the VTEP, a new route for the new host, wherein the new route is at least a longer match for the new host than currently existing routes for the new host, and providing the new route to a default gateway for the new host.

In general, in one aspect, the invention relates to a network device, comprising: a processor, a plurality of ports, and a virtual tunnel endpoint (VTEP) executing on the processor, wherein the VTEP is configured to: detect that a new host is connected to the VTEP, based on the detection, generating by the VTEP, a new route for the new host, wherein the new route is at least a longer match for the new host than currently existing routes for the new host, and provide the new route to a default gateway for the new host.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for detecting the presence of a new host by a virtual tunnel end-point (VTEP) and performing a route health injection for the new host in order to have in-bound traffic for the new host routed directly to the data center in which it now located instead of the in-bound traffic for the new host being transmitted to the new host via the data center in which it was previously located.

Figure 1:
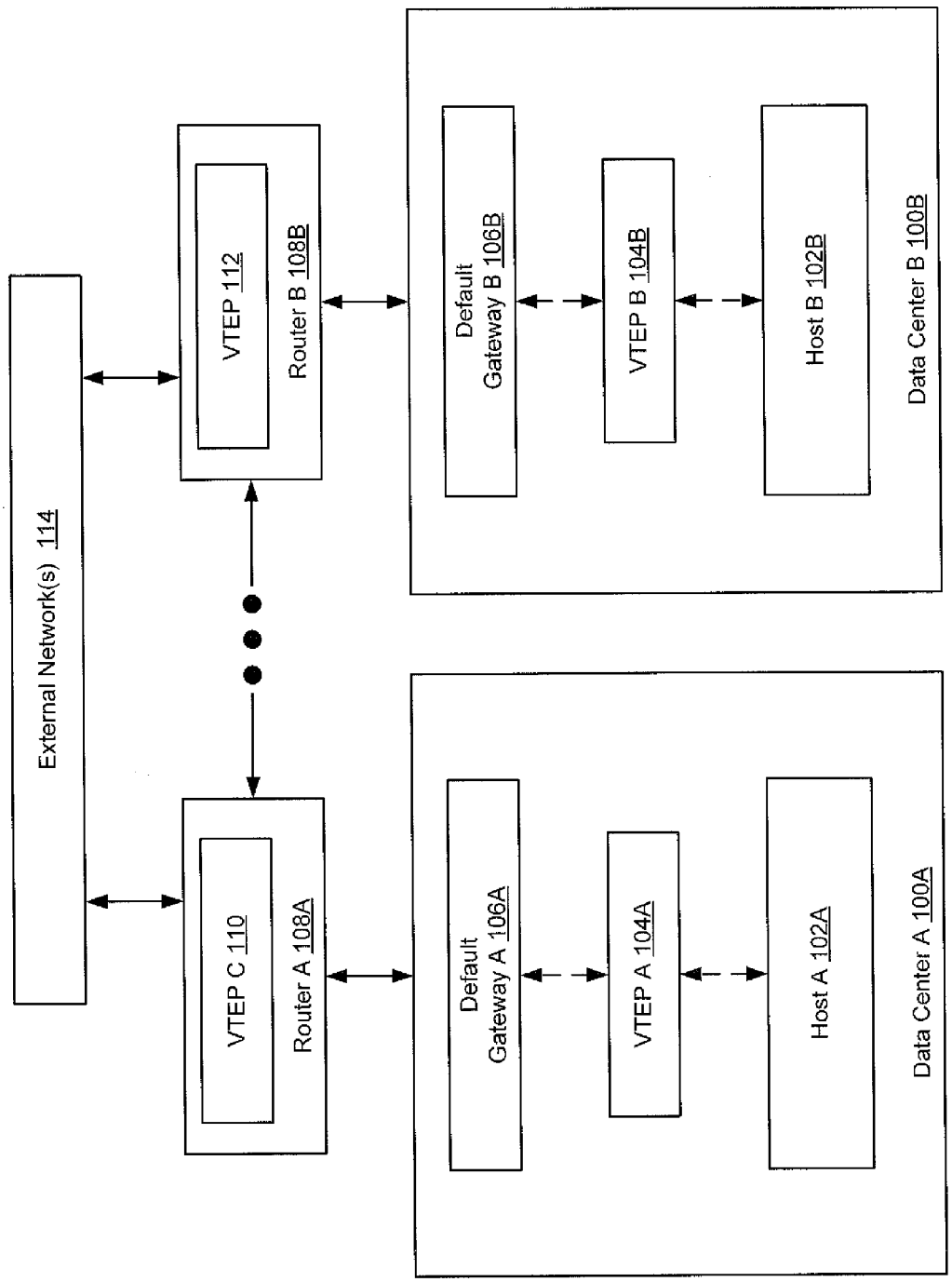
FIG. 1 shows a system in accordance with one or more embodiments of the invention.

FIG. 1 shows a system in accordance with one or more embodiments of the invention. The system includes one or more data centers (100A, 100B) operatively connected to each other via one or more routers (108A, 108B). The routers (108A, 108B) also enable packets to be sent to and received from external networks (114) (e.g., the Internet).

Each of the data centers includes physical computing resources. The physical computing resources include the physical hardware that is present in each of the data centers. The components shown in FIG. 1 within the data centers (e.g., hosts (102A, 102B), VTEPs (104A, 104B), default gateways (106A, 106B)) may be implemented on the appropriate physical computing resources as described below. As shown in FIG. 1, the hosts are directly connected (as defined below) to the VTEPs and the VTEPs are operatively connected to the default gateways. Further, hosts within the data center may communicate with other hosts external to the data center via one or more routers (108A, 108B). Specifically, the hosts within the data center may use routers (108A, 108B) that are external to the data center to communicate with hosts (or other destinations) within an external network (114) and/or with hosts in another data center. Each of the aforementioned components is described below.

In one embodiment of the invention, each VTEP (104A, 104B) is associated with its own Internet Protocol (IP) address and its own media access control (MAC) address. Further, each VTEP includes functionality to perform the methods shown in FIGS. 3-4. In addition, each VTEP includes functionality to process received VXLAN packets in accordance with the VXLAN protocol.

Each VTEP (104A, 104B) may be implemented as a combination of software and storage (volatile and/or persistent storage). Alternatively, each VTEP (104A, 104B) may be implemented as a combination of hardware and storage (volatile and/or persistent storage). In another alternative, each VTEP (104A, 104B) may be implemented as a combination of hardware and software.

In one embodiment of the invention, one or more VTEPs (104A, 104B) are implemented on switches or routers. In one embodiment of the invention, a switch is a physical device that includes persistent storage, memory (e.g., Random Access Memory), one or more processors, and two or more physical ports. Each port may be connected to either: (i) a computer system, or (ii) a network device. The computer system may include any type of system (including servers) that is configured to send and receive packets. The network device includes any device that is part of the network infrastructure such as a switch or a router. Each switch is configured to receive packets via the ports and determine whether to (i) drop the packet, or (ii) send the packet out over another one of the ports on the switch. How the switch makes the determination of whether to drop or send the packet depends on whether the switch is a layer-2 (L2) switch or a layer-3 (L3) switch (also referred to as multilayer switch). If the switch is operating as a L2 switch, the switch uses the destination media access control (MAC) address in the received packet along with a forwarding table to determine out of which port to send the packet. If the switch is operating as a L3 switch, the switch uses the destination internet protocol (IP) address in the received packet along with a routing table to determine out of which port to send the packet.

In one embodiment of the invention, a router (108A 108B) is a physical device that includes persistent storage, memory (e.g., Random Access Memory), one or more processors, and two or more physical ports. Each port may be connected to either: (i) a computer system (described above) or (ii) a network device (described above). Each router is configured to receive packets via the ports and determine whether to (i) drop the packet, or (ii) send the packet out over another one of the ports on the router. How the router makes the determination of whether to drop or send the packet using the destination internet protocol (IP) address in the received packet along with a routing table to determine out of which port to send the packet.

Continuing with the discussion of FIG. 1, each host (102A, 102B) corresponds to a computer system (as described above) or to a virtual machine executing on a computer system. Regardless of the implementation, each host (102A, 102B) includes functionality to (i) generate a MAC frame (see FIG. 2), (ii) issue address resolution protocol (ARP) requests, and (iii) receive ARP responses.

In one embodiment of the invention, a default gateway (106A, 106N) is a network device, typically a router, that is used by the host (102A, 102B) to communicate with the other hosts that are outside of the data center in which the host is located. More specifically, in order for the host to generate a Media Access Control (MAC) frame to issue to the VTEP (see FIG. 3, below), the host needs to obtain both the IP address and MAC address for the destination (i.e., the other host with which the host is communicating). If the destination is outside the data center, the host will need to send an initial MAC frame to the default gateway, where the destination MAC address in the MAC frame is the MAC address of the default gateway. Upon receipt of the initial MAC frame, the default gateway uses the IP address of the destination in combination with a routing function in the default gateway to determine the next hop in the path towards the destination. Once the next hop is identified, the MAC address of the next hop is obtained. The MAC address for the destination will then be used to generate a new MAC frame that includes the same payload as the initial MAC frame but with a new MAC address for the next hop. Those skilled in the art will appreciate that subsequent MAC frames to the aforementioned destination may be generated using the next hop MAC address stored in an ARP cache on the host, where the next hop MAC address is associated with the destination IP address in the ARP cache.

For simplicity, FIG. 1 does not show switches, routers, servers, other hardware components and/or network devices, that are part of the network infrastructure; however, those skilled in the art will appreciate that the VTEPs (104A, 104B), and hosts (102A-102B) may be located within any network infrastructure that includes any combination of switches, routers, servers, other hardware components and/or network devices. Further, the invention is not limited to the system shown in FIG. 1. Specifically, the system may include any number of hosts, VTEPs, default gateways, routers, and external networks without departing from the invention.

Figure 2:
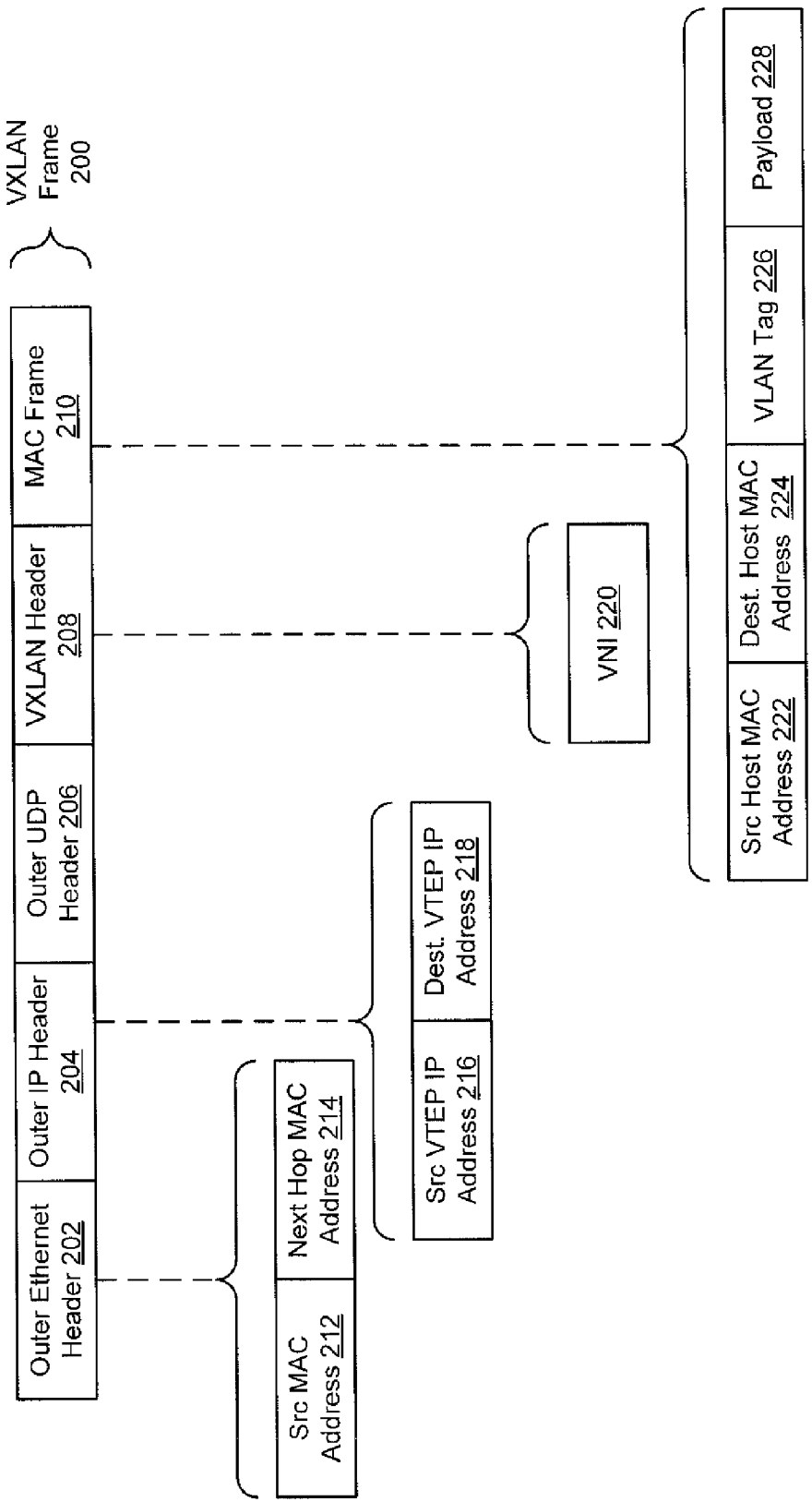
FIG. 2 shows a VXLAN frame in accordance with one or more embodiments of the invention.

FIG. 2 shows a VXLAN frame in accordance with one or more embodiments of the invention. The VXLAN frame (200) includes: (i) a MAC frame (210), (ii) a VXLAN header (208), (iii) an outer UDP header (206), (iv) an outer IP header (204), and (v) an outer Ethernet header (202). Each of the aforementioned components is described below.

In one embodiment of the invention, the MAC frame (210) is generated by a source host and may include (i) a source host MAC address (222), (ii) a destination host MAC address (224), a VLAN tag (226), and a payload (228). The VLAN tag (226) may or may not be included within the MAC frame. The VLAN tag is defined in accordance with IEEE 802.1Q. Further, the payload (228) may include the content that the source host is attempting to transmit to the destination host. The MAC frame may include other information/content without departing from the invention.

In one embodiment of the invention, the VXLAN header (208) may include, but is not limited to, a virtual network identifier (VNI). The VNI scopes the MAC frame (210) originated by the host such that the MAC frame (210) may only be received by destination hosts associated (via a VTEP) with the same VNI. The VXLAN header may include other information/content without departing from the invention.

In one embodiment of the invention, the outer Ethernet header (202), the outer IP header (204), and the outer UDP header (206) are used to route the VXLAN frame from the source VTEP to the destination VTEP. To this end, the outer Ethernet header (202) includes the source MAC address (212) and the next hop MAC address (214) and the outer IP header (204) includes the source VTEP IP address (216) and the destination VTEP IP address (218). The aforementioned mentioned components may include other information/content without departing from the invention. The VXLAN frame may include other components without departing from the invention.

While the various steps in the flowcharts are presented and described sequentially, one of ordinary skill will appreciate that some or all of the steps may be executed in different orders, may be combined or omitted, and some or all of the steps may be executed in parallel. In one embodiment of the invention, the steps shown in FIGS. 3-4 may be performed in parallel with any other steps shown in FIGS. 3-4 without departing from the invention.

Figure 3:
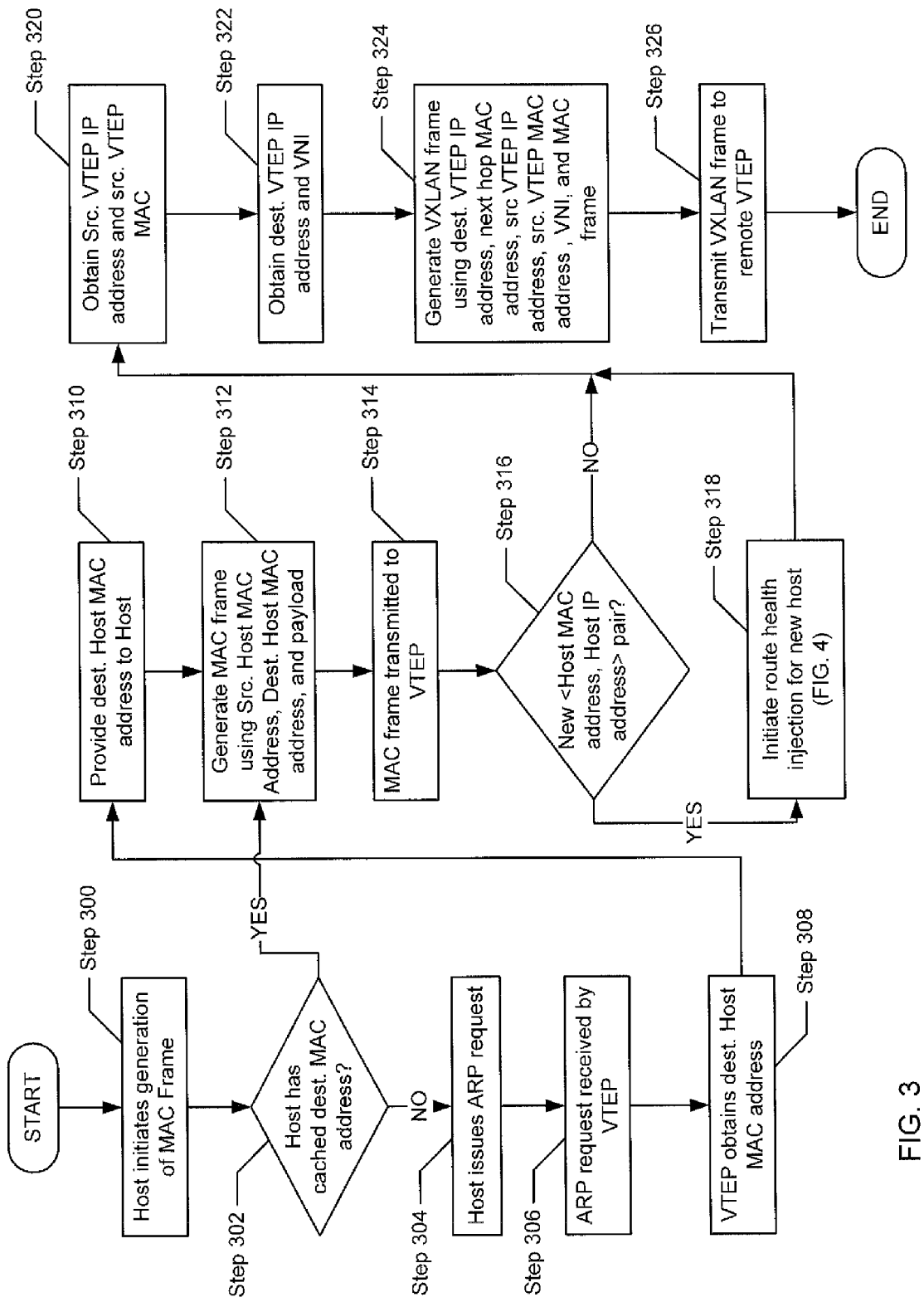
FIG. 3 shows a method for generating and transmitting a VXLAN frame in accordance with one or more embodiments of the invention.

FIG. 3 shows a method for generating and transmitting a VXLAN frame in accordance with one or more embodiments of the invention. More specifically, FIG. 3 shows a method for using the active forwarding table by a VTEP in order to enable a host to communicate with another host on the network using VXLAN.

In step 300, a host initiates the generation of a MAC frame. At this stage, the host knows the IP address of the destination host. In step 302, a determination is made about whether the destination host MAC address is present in a cache (or other storage medium) on the host or server on which the host is executing. If the destination host MAC address is present in a cache, the process proceeds to step 312. Otherwise, the process proceeds to Step 304.

In step 304, the host issues an Address Resolution Protocol (ARP) request that includes the destination host IP address. In step 306, the ARP request is received by the VTEP. More specifically, the ARP request is intercepted by the VTEP. In step 308, VTEP services the ARP request using, for example, the mechanism defined in section 4.2 of the document entitled "VXLAN: A Framework for Overlaying Virtualized Layer 2 Networks over Layer 3 Networks" version 04 dated May 2013 (hereafter, "VXLAN protocol"). The VXLAN protocol is hereby incorporated by reference in its entirety. Further, the invention is not limited to a particular version of the VXLAN protocol. Continuing with the discussion of FIG. 3, in order for the source host and the destination host to communicate, the source host and the destination host must both be associated with the same VNI. If they are not associated with the same VNI then the VTEP does not return the destination host MAC address to the source host in response to the ARP request and the process ends (not shown). Assuming that the source host and the destination host are associated with the same VNI, the process proceeds to step 310. In step 310, the destination host MAC address is provided to the host as part of an ARP reply.

In step 312, the source host generates a MAC frame that includes the source host MAC address, the destination host MAC address, and the payload. In step 314, the MAC frame is transmitted from the host to the VTEP.

In step 316, the VTEP determines whether the MAC frame includes a new <source Host MAC address, Host IP address> pair. Said another way, the VTEP determines the presence of a new host that is directly connected to the VTEP. In this context, a host is deemed to be directly connected to the VTEP if the VTEP receives un-encapsulated MAC frames (210 in FIG. 2) from the host and subsequently encapsulates the MAC frame within a VXLAN frame (200 in FIG. 2).

A VTEP may determine that a host is new if (i) MAC frames for the <source Host MAC address, source Host IP address> pair have never been received by the VTEP or (ii) if the host was initially connected to another VTEP and then migrated to the VTEP. With respect to scenario (ii), the VTEP may use any mechanism and/or data structure(s) to track the migration of hosts.

Figure 4:
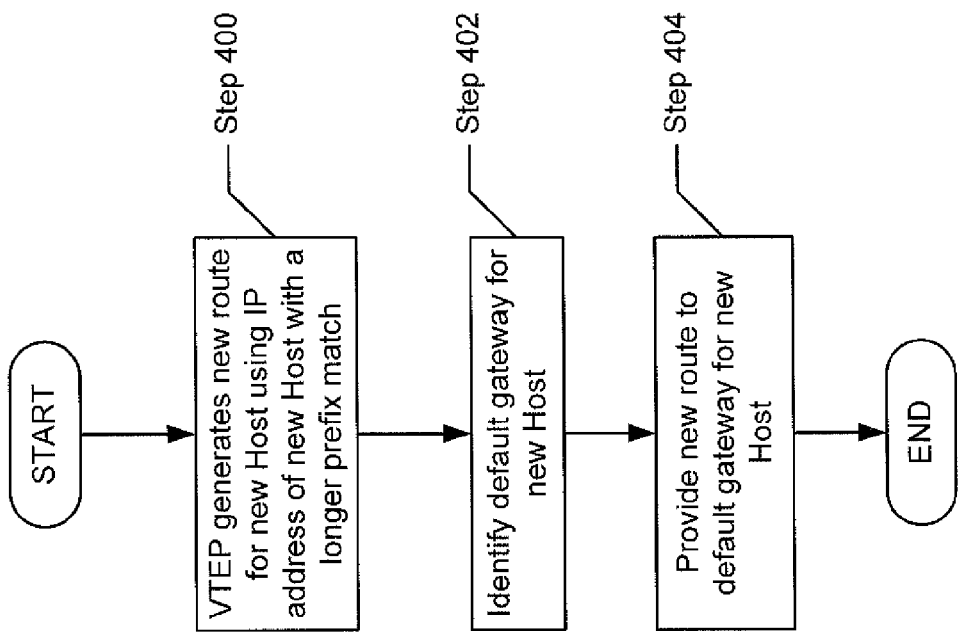
FIG. 4 shows a method for route health injection in accordance with one or more embodiments of the invention.

Returning to Step 316, if the MAC frame includes a new <source Host MAC address, Host IP address> pair, the process proceeds to step 318; otherwise, the process proceeds to step 320. In step 318, route health injection for the new host is initiated. FIG. 4 describes route health injection in accordance with one or more embodiments of the invention. In step 320, the source VTEP IP address and the source VTEP MAC address are obtained from the VTEP. In step 322, the VTEP uses the <destination host MAC address, destination host IP address> pair to determine the destination VTEP IP address and VNI. The VTEP IP address is used by a routing function (and corresponding routing table(s)) to determine the next hop in the path between the source VTEP and the destination VTEP. Once the next hop is identified, the MAC address of the next host (214 in FIG. 2) is determined.

In step 324, a VXLAN frame is generated using the aforementioned information in accordance with the VXLAN protocol. Specifically, in the generated VXLAN frame, the source MAC address (212 in FIG. 2) is the source VTEP MAC address, the next hop MAC address (214 in FIG. 2) is the MAC address obtained in step 322, the source VTEP IP address (216 in FIG. 2) is the IP address of the source VTEP, the destination VTEP IP address (218 in FIG. 2) is the VTEP IP address obtained in step 322, and the VNI (220 in FIG. 2) is obtained in step 322.

In step 326, the VXLAN frame is routed to the destination VTEP. Though not shown in FIG. 3, upon receipt of the VXLAN frame by the destination VTEP, the destination VTEP extracts the MAC frame from the VXLAN frame and then uses the information in the MAC frame (see FIG. 2) to bridge the MAC frame to the destination host.

FIG. 4 shows a method for route health injection in accordance with one or more embodiments of the invention.

In step 400, the VTEP generates a new route for the newly detected host. The new route is a longer match (or longest match) than the routes that are currently associated with the new host. For example, if the current route for the new host is 10.1.x/24, then the new route may be 10.1.1.5/32, which is the longest route. The new route may be generated in accordance with IPv4 or IPv6. In one embodiment of the invention, the VTEP may include functionality to obtain the current route in order to ensure that the new route is a longer match than the current route.

In step 402, the VTEP identifies the default gateway for the new host. The default gateway corresponds to the default gateway that is operatively connected to the VTEP.

In step 404, the VTEP provides the new route to the default gateway. Though not shown in FIG. 4, upon receipt of the new route, the default gateway advertises the new route to other routers (or network devices) to which it is operatively connected. The new routes may be advertised using any know protocol, e.g., Border Gateway Protocol.

Figure 5A:
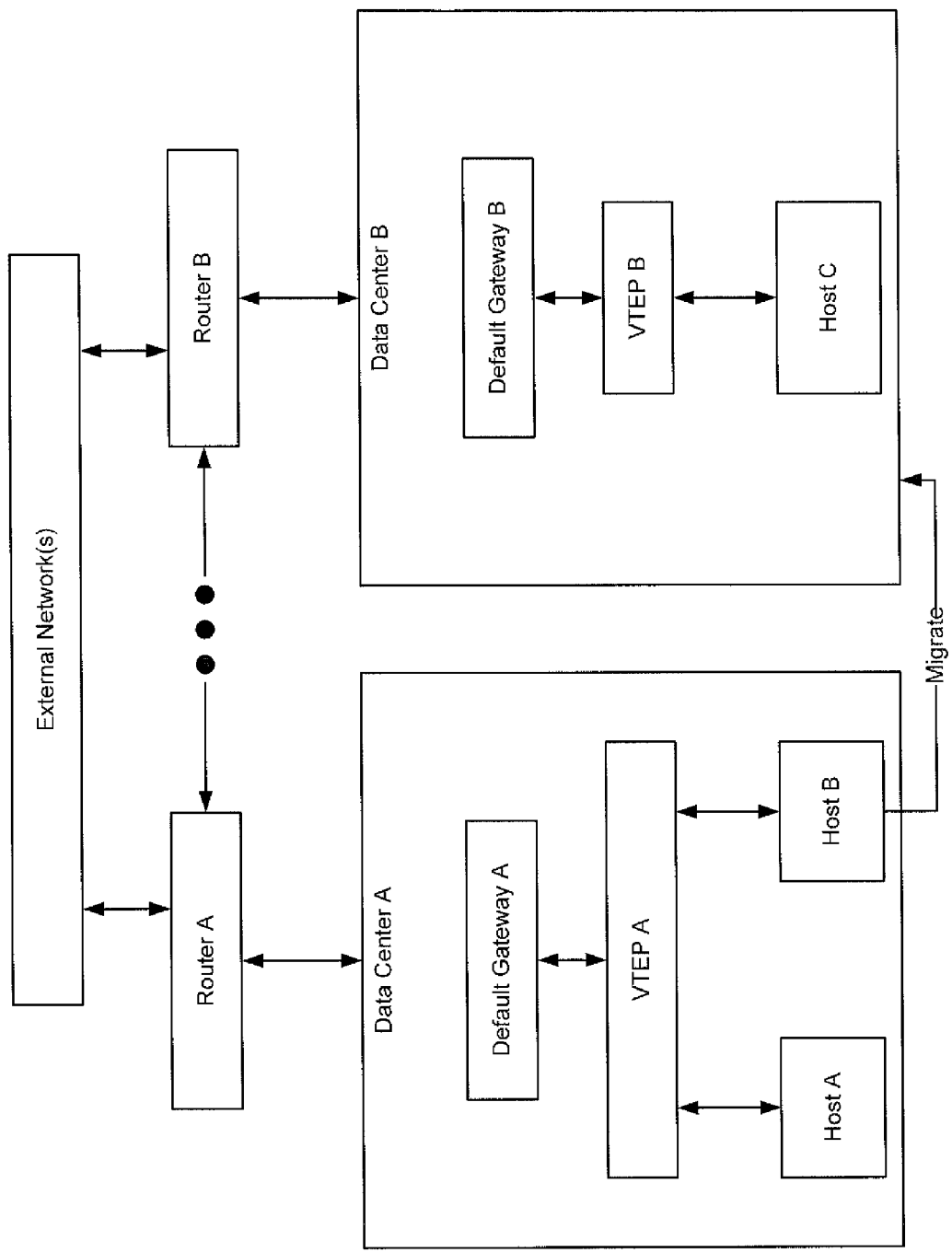
FIGS. 5A-5B show an example in accordance with one or more embodiments of the invention.
Figure 5B:
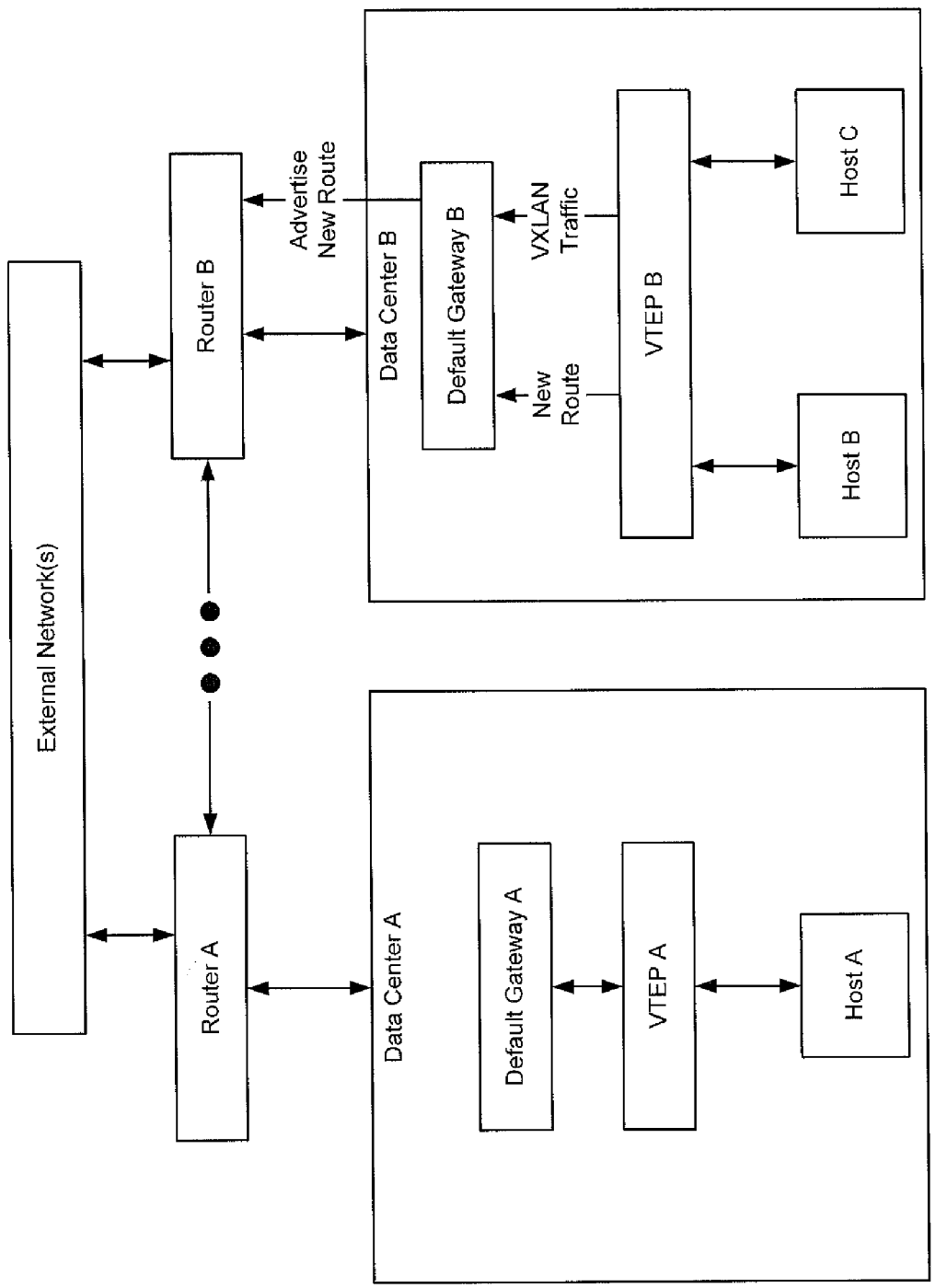

FIGS. 5A-5B show an example in accordance with one or more embodiments of the invention. The example is not intended to limit the scope of the invention.

Referring to FIG. 5A, consider the scenario in which there are two data centers (Data center A, Data center B), where Data Center A includes Host A and Host B and Data Center B includes Host C. Further, assume that the current route advertised for Host B is 10.1.1.5/16 and that at this time the current route is the longest route for Host B. Accordingly, using the aforementioned route, packets sent from outside Data Center A pass through Router A, Default Gateway A and VTEP A prior to reaching Host B. At some point in time, Host B is migrated to Data center B.

Referring to FIG. 5B, when Host B sends a MAC frame to VTEP B, VTEP determines that Host B is newly connected to VTEP B and, accordingly, initiates the route health injection described in FIG. 4. Specifically, VTEP B generates a new route for Host B. In this example, the new route may be 10.1.1.5/24. The new route is then provided to Default Gateway B (i.e., the new default gateway for Host B). Default Gateway B subsequently advertises the new route to Router B. Router B may in turn advertise the new route to other routers.

Once the new route has been advertised, incoming packets from the external network pass to Router B, Default Gateway B, and VTEP B prior to reaching Host B. If the new route had not been advertised, incoming packets from the external network pass to Router A, Router B, Default Gateway B, and VTEP B prior to reaching Host B. As a result, the new route may prevent at least one extra hop in the path between the external network and Host B. In one or more embodiments of the invention, the saving of that at least one extra hop may involve not using the hop between two data centers. In this scenario, that hop between data centers may be very "expensive" in terms of bandwidth and/or monetary cost, where the "cost" of the extra hop may be incurred by the company that is using the data centers.

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor perform a method, the method comprising:
   receiving, by a virtual tunnel endpoint (VTEP), a media access control (MAC) frame from a new host, comprising a source host MAC address and a source host Internet Protocol (IP) address associated with the new host;
   detecting, by the VTEP and in response to the receiving, that the new host is connected to the VTEP, wherein the VTEP is executing on a network device;
   based on the detecting, generating by the VTEP, a new route for the new host, wherein the new route is at least a longer match for the new host than currently existing routes for the new host;
   providing the new route to a default gateway for the new host;
   generating, by the VTEP, a virtual extensible local area network (VXLAN) frame comprising the MAC frame; and
   transmitting the VXLAN frame towards a remote VTEP.

2. The non-transitory computer readable medium of claim 1, wherein the network device is a switch.

3. The non-transitory computer readable medium of claim 2, wherein the default gateway is a router operatively connected to the switch.

4. The non-transitory computer readable medium of claim 1, wherein the VTEP is configured to implement a VXLAN protocol.

5. The non-transitory computer readable medium of claim 1, wherein the new route is a longest match route for the new host.

6. The non-transitory computer readable medium of claim 1, wherein the new route is an Internet Protocol version 6 route.

7. The non-transitory computer readable medium of claim 1, wherein the new route is an Internet Protocol version 4 route.

8. The non-transitory computer readable medium of claim 1, wherein the new host was previously connected to a second VTEP and wherein the new host was previously using a second default gateway.

9. The non-transitory computer readable medium of claim 7, wherein the VTEP is located in a first data center and the second VTEP is located in a second data center, wherein the first data center is distinct from the second data center.

10. The non-transitory computer readable medium of claim 1, wherein the new host is a virtual machine executing on a server.

11. The non-transitory computer readable medium of claim 1, wherein detecting, by the VTEP, that the new host is connected to the VTEP, comprises:
    determining that the MAC frame has never been received by the VTEP.

12. The non-transitory computer readable medium of claim 1, wherein detecting, by the VTEP, that the new host is connected to the VTEP, comprises:
    determining that the new host was previously connected to another VTEP.

13. A network device, comprising:
    a processor;
    a plurality of ports; and
    a virtual tunnel endpoint (VTEP) executing on the processor, wherein the VTEP is configured to:
        receive a media access control (MAC) frame from a new host, comprising a source host MAC address and a source host Internet Protocol (IP) associated with the new host;
        detect, in response to the receiving, that the new host is connected to the VTEP;
        based on the detection, generate a new route for the new host, wherein the new route is at least a longer match for the new host than currently existing routes for the new host;
        provide the new route to a default gateway for the new host;
        generate a virtual extensible local area network (VX-LAN) frame comprising the MAC frame; and
        transmit the VXLAN frame towards a remote VTEP.

14. The network device of claim 13, wherein the network device is a switch.

15. The network device of claim 13, wherein the network device is located in a first data center and wherein the new was previously located in a second data center and connected to a second VTEP in the second data center.

16. The network device of claim 13, wherein new host is a virtual machine executing on a computing device.

17. The network device of claim 16, wherein the computing device is physically connected network device through one of the plurality of ports.

18. The network device of claim 13, wherein the MAC frame comprises a payload that is destined for another host in a network to which the network device is operatively connected.

* * * * *